Feb. 3, 1948.　　　　S. A. POSPISIL　　　　2,435,323
OUTDOOR CONVERTIBLE GRILL OR STOVE
Filed Oct. 6, 1944
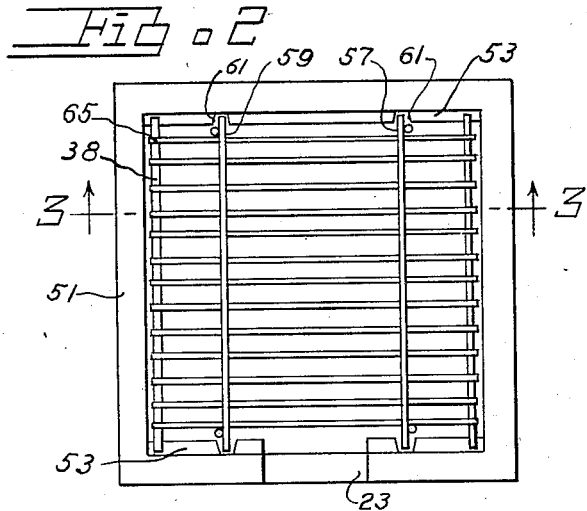
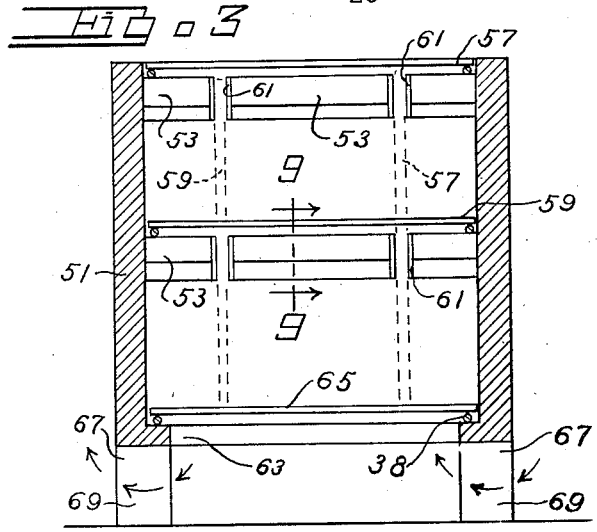
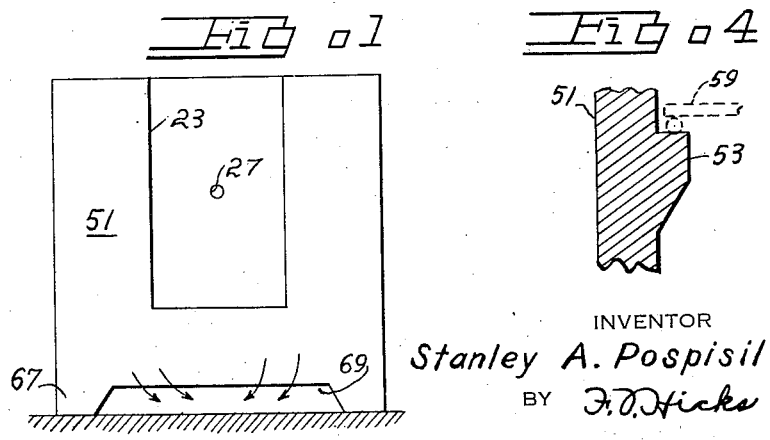
INVENTOR
Stanley A. Pospisil
BY F. O. Hicks
ATTORNEY Patented Feb. 3, 1948

2,435,323

UNITED STATES PATENT OFFICE 2,435,323

OUTDOOR CONVERTIBLE GRILL OR STOVE

Stanley A. Pospisil, Miami, Fla.

Application October 6, 1944, Serial No. 557,502

3 Claims. (Cl. 126—25)

My invention pertains to outdoor stoves and barbecues and more particularly to a convertible barbecue, grill or stove for camping, vacationing and like purposes.

It is an object of my invention to provide an outdoor barbecue, grill or stove which may be conveniently converted and adjusted for a great variety of different kinds of cooking with the various types of fuel as available.

It is also an object of my invention to provide a convertible outdoor grill or stove of a simple construction embodying a minimum number of parts which may be very conveniently arranged and adjusted for a multiplicity of different uses and operations.

It is a further object of my invention to provide an outdoor grill or stove which may conveniently be adapted for portable use as in camping or for permanent anchorage as in parks or yards.

Another object of my invention is to provide such an outdoor grill or stove such that it may be used as a base to be built around by bricks, stone or other masonry structure.

Further objects and advantages are within the scope of the invention, such as relate to the arrangement, operation and function of the related elements of the structure, to various details of construction and to combinations of parts, elements per se, and to economies of manufacture and numerous other features as will be apparent from a consideration of the specification in conjunction with the drawing disclosing specific embodiments of the invention, in which:

Fig. 1 is a front elevational view thereof;

Fig. 2 is a plan view of my invention provided with an arrangement for supporting the grates in various positions;

Fig. 3 is a cross-sectional view of the grill body or enclosure on line 3—3 in Fig. 2, and showing the grates horizontally disposed, and also representing in dotted lines how two grates may be vertically disposed; and Fig. 4 is an enlarged detail cross-section view through one of the grate cleats.

Referring more specifically to Figs. 1 through 4 of the drawing, I have illustratively disclosed an embodiment of my convertible outdoor grill or stove comprising a grill body or housing 51 of a generally rectangular shape having a front wall and a rear wall joined by two side walls and open at the top and bottom. A good draft is provided from all directions of wind, by providing a leg 67 under each corner of the grill so that four air intake ports 69 are formed under the lower edges of the walls of the grill housing. The grill body or housing 51 is preferably made of any suitable refractory cement or ceramic material. However, it may be made of cast metal, where a heavy permanent structure is desired, or of sheet metal where a lightweight portable device is preferred. When the grill is made of metal a layer, sheet or coating of any suitable thermal insulation material is preferably provided either on the outer or inner surface to diminish the rate of heat transmission therethrough.

The front wall of the grill housing is provided with a doorway opening 23, which may be centrally disposed and vertically elongated, for convenient insertion and rotation manually of a spit with the inner end rotatively supported in an aperture 27 in the rear wall. Also the doorway serves for the convenient insertion of various broilers, grills, toasters and the like, to be more fully described subsequently.

The grill body 51 is provided with grate cleats 53 extending horizontally along the inner surfaces of the front and back walls. As shown in Fig. 4, such cleats 53 may be integral with the wall and are preferably inclined to the wall from the lower edge. The grate cleats 53 are suitably positioned for supporting an intermediate grate 59, and a top grill or grate 57. For supporting two of the grates, 57 and 59 for example, in vertical spaced positions, as shown in Fig. 2 and represented dotted in Fig. 3, the grate cleats on the back wall and on the front wall are provided with suitable aligned notches or guide spaces 61. An inwardly directed shoulder or cleat 63 is provided around the bottom of the housing 51 for supporting a bottom grate 65. Legs 67 support the housing 51 above the ground and form air inlet ports 69. Two grates inserted vertically into the notches 61, as represented by dotted lines in Fig. 3, rest upon the bottom grate and contain fuel and coals on two opposite sides of a central cooking space. The horizontal grate supporting cleats may be provided at various different desirable levels as desired.

The grates in horizontally spaced positions, as shown in full lines, may be advantageously utilized for cooking with various fuels, and also, if desired, the top may be covered and the front doorway 23 may be closed to provide an oven space, or a barbecue. By dropping hot embers to the bottom, the oven is converted into a pit, for old fashion barbecues and clam bakes.

The various grates and grills utilized may be made of rods, bars, expanded metals or strips of iron or steel, or other suitable non-corrosive metals which may be secured together by welding.

It is apparent that within the scope of my invention modifications and different arrangements may be made other than herein disclosed, and the present invention is illustrative merely, the invention comprehending variations thereof.

I claim:

1. In a housing for a convertible barbecue grill or stove, a heat resisting grill housing having a front wall and a back wall joined by two side walls forming a substantially rectangular enclosure open at the top and bottom, an open area in said front wall, grate support means extending from the inner surfaces of the front and back walls at various levels for supporting grates horizontally at various spaced vertical positions, said grate support means being provided with guide spaces extending vertically through said grate support means on the inside of the back wall and provided with guide spaces extending vertically through the grate support means on the inner side of the front wall in aligned relation to the guide spaces on the back wall for receiving and supporting the opposite edges of grates to be supported and spaced vertically in said housing.

2. A convertible barbecue grill and stove comprising, a heat resisting grill housing having a front wall and a back wall joined by two side walls for forming a substantially rectangular enclosure open at the top and bottom, an open area in said front wall, a plurality of grates of suitable dimensions to be supported in said enclosure, grate support means extending along the inner surfaces of the front and rear walls at various levels for supporting the grates horizontally at various spaced vertical positions, said grate support means being provided with guide spaces extending vertically through the grate support means on the inside of the back wall for receiving and supporting the edges of two grates to be supported in vertical spaced positions in said space, and provided with guide spaces extending vertically in the grate support means on the inner side of the front wall in aligned relation to the guide spaces on the back wall for receiving and supporting the opposite edges of the grates to be supported and spaced apart vertically in said housing.

3. A convertible barbecue grill or stove in accordance with claim 2, and further characterized by the lower portions of said housing walls being conformed to provide inlet ports for combustion air.

STANLEY A. POSPISIL.

REFERENCES CITED

The following references are of record in the file of this patent:

UNITED STATES PATENTS

| Number | Name | Date |
| --- | --- | --- |
| 1,545,584 | Devereux | July 14, 1925 |
| 1,701,033 | Elbert | Feb. 5, 1929 |
| 1,778,330 | Mayer et al. | Oct. 14, 1930 |
| 1,836,894 | Bedigian | Dec. 15, 1931 |
| 2,048,769 | Anderson | July 28, 1936 |
| 2,246,440 | Hester | June 17, 1941 |
| 2,314,772 | Corra | Mar. 23, 1943 |
| 2,335,217 | Tate | Nov. 23, 1943 |

FOREIGN PATENTS

| Number | Country | Date |
| --- | --- | --- |
| 308,104 | Great Britain | Mar. 21, 1929 |